United States Patent [19]

Savard

[11] Patent Number: 5,123,451
[45] Date of Patent: Jun. 23, 1992

[54] PIPELINE REPAIR SLEEVE ASSEMBLY

[75] Inventor: Donald D. Savard, Edmonton, Canada

[73] Assignee: Interprovincial Pipeline Company, Alberta, Canada

[21] Appl. No.: 458,257

[22] Filed: Dec. 28, 1989

[51] Int. Cl.5 .................. F16L 55/16; B65D 53/04; F16J 15/06
[52] U.S. Cl. ....................... 138/99; 264/36; 277/211; 277/215; 285/16; 285/286
[58] Field of Search ........... 138/97, 99; 29/402.09, 29/402.14; 277/207 A, 207 R, 210, 211, 215; 264/36, 248, 249; 285/15, 16, 286, 373, 419

[56] References Cited

U.S. PATENT DOCUMENTS

| 126,624 | 5/1872 | Coffee | 277/211 |
|---|---|---|---|
| 1,737,181 | 11/1929 | Woodward | 138/97 |
| 2,520,802 | 8/1950 | Hampton | 138/99 |
| 2,616,736 | 11/1952 | Smith | 138/99 X |
| 2,850,045 | 9/1958 | Soehnlen et al. | 138/99 |
| 3,043,342 | 7/1962 | Graham | 138/99 |
| 3,586,057 | 6/1971 | Lambert | 138/99 |
| 3,642,294 | 2/1972 | Hammon | 277/207 R |
| 3,836,183 | 9/1974 | Battle | 277/211 X |
| 4,057,082 | 11/1977 | King | 138/99 |
| 4,172,472 | 10/1979 | Parrish | 138/99 X |
| 4,391,300 | 7/1983 | Saylor et al. | 138/99 |
| 4,535,822 | 8/1985 | Rogers, Jr. | 138/99 |
| 4,756,338 | 7/1988 | Guyatt et al. | 138/99 |

FOREIGN PATENT DOCUMENTS

| 1237682 | 6/1988 | Canada . | |
| 54-109624 | 8/1979 | Japan | 138/99 |

Primary Examiner—Daniel P. Siodola
Assistant Examiner—William G. Battista, Jr.
Attorney, Agent, or Firm—Millen, White & Zelano

[57] ABSTRACT

The assembly comprises a pair of semi-circular steel shells. The inner surface of one shell forms a circular recess. A flat cylindrical annular seal element is seated in and fills the recess. The element is resilient and deformable. It has concentric protruding ribs on its top and bottom surfaces. The seal element is positioned to circumscribe a leaking small hole or crack in the wall of an internally pressurized pipeline. The shells are then circumferentially clamped against the pipeline to cause the element to seal around the leak and to effect tight shell-on-pipe contact. The steel side wall of the recess confines the compressed seal element. The side edges of the shells are then welded together longitudinally and circumferentially to create a permanent pressure vessel sealing and containing the leak.

3 Claims, 3 Drawing Sheets

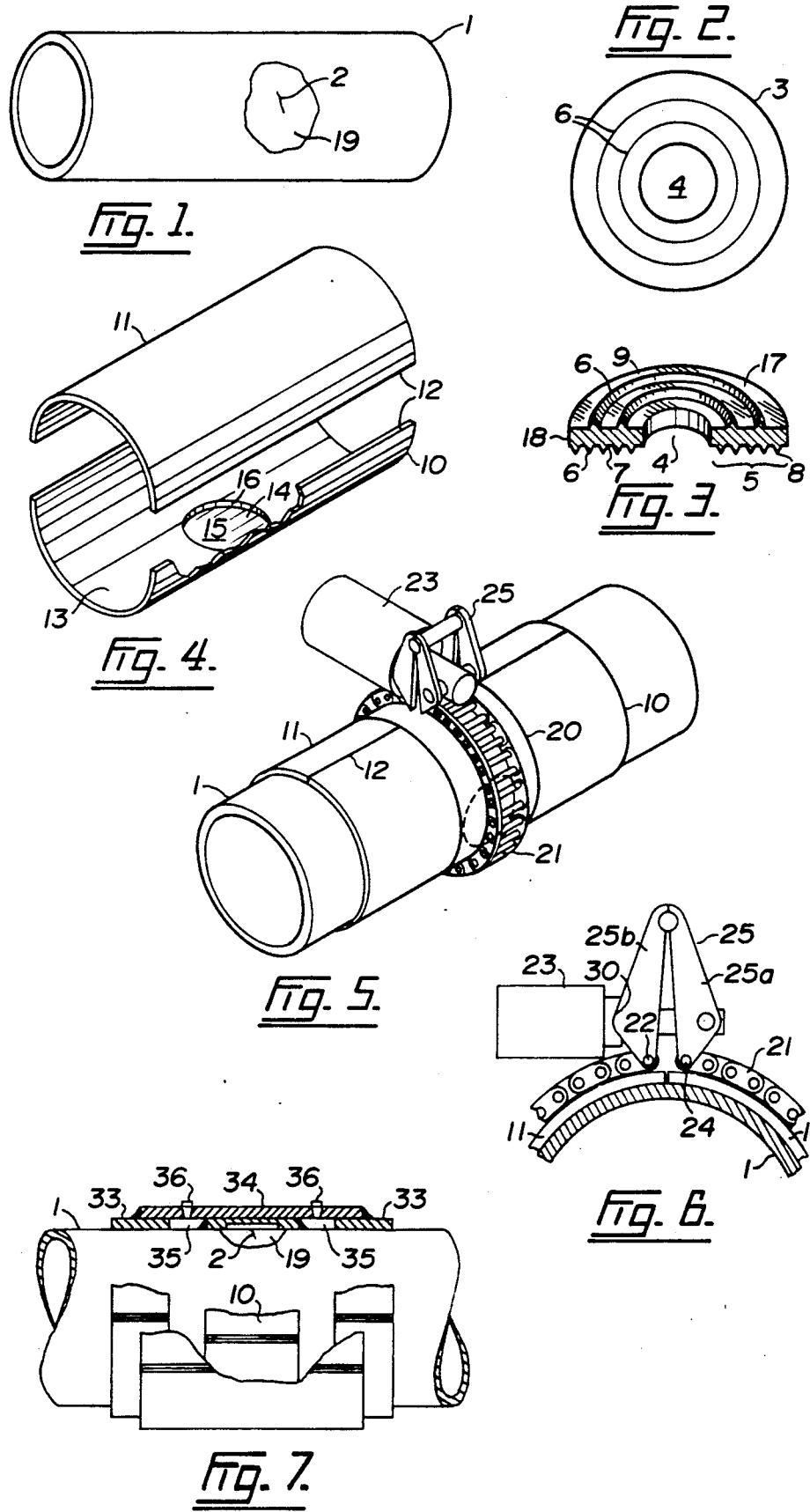

PIPELINE REPAIR SLEEVE ASSEMBLY

FIELD OF THE INVENTION

This invention relates to a novel seal element and a repair sleeve assembly for sealing and containing a leaking aperture in the wall of an internally pressurized pipeline or other containment member.

BACKGROUND OF THE INVENTION

With age, buried steel transmission pipelines transporting pressurized fluid can develop defects in the pipe wall. The defect may be a corrosion pit that extends only part way through the wall and thus is still non-leaking. Or it may be an aperture extending through the wall, in which case there is an actual leak.

Up until recently, when either leaking or non-leaking defects were discovered it was the common practice to empty the line, excavate the line at the defect and encapsulate the defective span in what amounted to a containment pressure vessel welded to the line. More particularly, a pair of semi-cylindrical flanged shells, having an internal peripheral protruding seal or gasket, would be bolted onto the line to provide a full encirclement sleeve. Circumferential fillet welds would then be applied between the sleeve ends and the pipeline wall, to effect completion of the pressure vessel. A typical example of such a sleeve is illustrated in U.S. Pat. No. 4,535,822, issued to Rogers.

A recent development in the pipeline repair art is disclosed in Canadian Patent 1,237,682, issued to Stata and Robinson and assigned to the present applicant. This patent teaches a full encirclement reinforcement sleeve system, for non-leaking defects. The system involves creating a thick-walled cylinder at the defect. This is done by clamping semi-circular shells against the pipeline wall with known force and then welding the shells longitudinally to yield a thick-walled cylinder having uniform hoop stress.

More particularly, in accordance with this system:
A pair of semi-cylindrical shells having lapped ends are welded together at their first ends and then the free second ends are pulled together, using upstanding lugs secured to the free ends and a clamping device pulling on the lugs, to cause the shells to clamp sufficiently tightly and evenly to the line to effectively form a thick-walled cylinder;
The clamping means is hydraulically actuated. This makes it possible to monitor the amount of clamping force being applied, so that a measure of the increasing extent of hoop stress being induced in the sleeve can be determined;
The clamping means are further designed to leave the free lapped ends of the two shells accessible for longitudinal welding; and
The sleeve is welded longitudinally along the shell ends, to produce a reinforcing thick-walled cylinder.

However, the Stata and Robinson prior art system has limitations. These limitations include:
That the system is not adapted to seal a defect that is actually leaking, since welding of the sleeve ends cannot be carried out in the vicinity of an actual leak; and
That the system involves using lugs, upstanding from the shell ends, that are pulled on by the hydraulic clamping means. These lugs preclude installing an outer reinforcement sleeve over the thick-walled cylinder, if this is desired.

Still another pertinent prior art concept and means to be considered is disclosed in U.S. Pat. No. 2,520,802, issued to Hampton. This patent teaches a pipe patch system involving:
an annular domed seal element that is positioned against a leaking containment wall, to encircle the leak;
a steel shell that has an inwardly opening recess, so that the seal element is partly contained by the recess wall;
and use of an outer clamp means, comprising a pair of semi-circular flanged shells bolted together at the flanges, for pressing against the shell to compress the seal element against the containment wall around the leak.

Another prior art patent of interest, relating to use of annular seal elements in the context of pipeline patches, is U.S. Pat. No. 1,737,181, issued to Woodward.

In still another prior art teaching of interest, U.S. Pat. No. 2,616,736, issued to T. L. Smith, discloses forming a gasket with a ribbed surface on one side. The raised ribs are provided in a cross-hatched pattern. The concept involved is that if fluid leaks past one rib, it will be contained by the next.

SUMMARY OF THE INVENTION

The present invention was developed to provide a repair sleeve assembly that could be applied to contain an actual leak of flammable fluid through a small crack or hole in an internally pressurized steel pipeline wall. The products of the development find particular application to a pipeline repair situation; however the system appears useful for other internally pressurized containment walls as well.

The invention involves a seal element. This seal element is seated in and confined by a recessed steel shell to provide an assembly that may be clamped against a leaking containment wall to seal the leak. In still another aspect: the seal element is combined with a pair of semi-circular steel shells, one of them being recessed as aforesaid that are circumferentially clamped to a pipeline to provide a full encirclement, inner sleeve assembly that seals the leak; the shells are welded longitudinally and circumferentially to create a pressure vessel about the leak; and an outwardly spaced second sleeve assembly may be positioned about the inner sleeve assembly, without being circumferentially welded to the pipeline, to protect those portions of the pipeline wall, that may be embrittled by the inner sleeve assembly circumferential welds, from the effects of flexing of the line.

As indicated, the invention involves a seal element. The seal element is formed of flexible, deformable, resilient material and is flat and annular in form. Preferably, it is cylindrical in configuration and provides horizontal top and bottom surfaces and vertical side surfaces. The seal element has a plurality of generally concentric, spaced apart ribs protruding generally perpendicularly from each of its top and bottom surfaces. Each rib extends in unbroken fashion about the periphery of the central aperture of the annular seal element.

The seal element is particularly adapted for use in conjunction with an arcuate steel shell which presses the element against the containment wall having the leak. Preferably, the element is used with a semi-circular shell forming part of a full encirclement sleeve. The inner surface of the shell forms an inwardly opening, substantially centrally positioned cavity or recess adapted to receive and closely fit the seal element, to support it closely and continuously along its top and outer side surfaces. When seated in the recess and while still unclamped, the seal element protrudes inwardly from the shell a short distance-stated otherwise, the seal element is supported and contained by the shell along the element's top surface and along substantially all of its outer vertical extent, but a sufficient portion of the element still protrudes to perform the sealing function.

When leaking pressurized fluid presses against the inner vertical surface of the seal element, the steel surfaces of the recess-forming shell wall prevent any significant upward or sideways escape or extrusion of the seal element. Instead, the ribs are increasingly pressed upwardly and downwardly against the sleeve and containment wall respectively, to better seal thereagainst. In addition, the provision of a plurality of concentric ribs ensures that an outer sealing rib is available to substitute for an inner sealing rib if the latter should fail. Furthermore, the ribs are formed with sufficiently narrow rims so that they can penetrate difficult-to-seal zones, such as that formed by the irregular surface along the edge of a weld seam, to provide the desired seal.

In a preferred aspect of the invention, a pipeline repair system is provided which obviates the prior practice of longitudinally welding the first ends of the shells and using lugs to pull the free shell ends together. More particularly, two semi-circular shells are provided. Each is preferably lapped at both ends. The combined length of the shells preferably is such that, when they are tightly clamped against the pipeline, their ends do not abut but the lapped ends may engage or overlap. One shell carries the seal element in a recess, as previously described. The shells and the seal element together form a repair sleeve assembly. An elongated flexible member, such as a chain, is provided. The ends of the chain are secured to a tightening device, such as a scissor clamp actuated by a hydraulic cylinder. Once the shells are emplaced about the pipeline and the chain is holding them in place in contact with the pipeline, the cylinder can then be hydraulically actuated to contract and cause the chain to tighten and circumferentially press the shells against the pipeline wall with steel-on-steel contact. When the hydraulic pressure applied reaches a pre-determined value that equates with inducing a desired hoop stress in the shells, then the free ends of the shells are welded longitudinally and the end edges of the shells are welded circumferentially to the pipeline, thereby effecting a permanent seal around the leak.

In the course of this procedure, the seal element seals the leak as the shells are pressed against the pipeline wall. It is then safe to carry out welding to complete the repair.

In another preferred variation of the foregoing, the described seal element can be used with the recessed shell (which may be flat) to seal a leak in other steel containment walls, such as that of a storage tank, by pressing it against the wall with a suitable clamping means and then welding the shell to the wall.

In a more preferred reinforced form of the pipeline repair sleeve system, a pair of split collars are positioned around the pipeline, one on each side of the assembled welded repair sleeve assembly. The collars each have a slightly greater outer diameter than that of the repair sleeve. A second pair of semi-circular shells are mounted around the repair sleeve and bridge between the collars. The second shells are then welded both longitudinally and circumferentially at their ends to the collars. In this way, an oversleeve assembly is provided to reinforce the inner repair sleeve assembly and protect it from bending stresses. The annular space between the repair sleeve assembly and the oversleeve assembly may be filled with a protective filler, such as liquid epoxy.

Broadly stated, the invention comprises the following combination: a pipeline containing pressurized fluid and having a leaking aperture in its wall and a repair sleeve assembly sealing the aperture, said repair sleeve assembly comprising a pair of substantially semi-circular non-flanged and non-apertured first and second shells and a flat, annular seal element retained by the first of the shells, said seal element having top and bottom and inner and outer side surfaces, said first shell having an inner surface which is configured to form an inwardly opening recess shaped to closely fit and receive the seal element, the seal element being seated in the recess and filling it, so that the seal member is rigidly confined along the full extent of its top and outer side surfaces by the solid surfaces forming the recess and the seal element surrounds the aperture and seals against the pipeline surface, the seal element having a central opening that is in communication with the leak aperture, whereby the pressurized fluid acts against the seal element's inside side surface, said seal element being formed of flexible deformable resilient material, said shells extending around substantially the entire periphery of the pipeline, said shells having been circumferentially clamped to the pipeline so that they have non-recessed portions of their inside surfaces in tight contact with the pipeline, but the ends of the shells not being in abutment, said shells being welded longitudinally and circumferentially to effectively form a pressure vessel with the pipeline.

DESCRIPTION OF THE DRAWINGS

FIG. 1 is a perspective view of a section of pipeline having a leak to be repaired;

FIG. 2 is a top plan view of the seal element;

FIG. 3 is a side sectional view of the seal element of FIG. 2, taken along the line A, showing some typical dimensions;

FIG. 4 is a perspective view of the steel shells;

FIG. 5 is a perspective side view showing the shells clamped on the pipeline by the chain and cylinder assembly;

FIG. 6 is a side view showing the scissor clamp used to tighten the chain;

FIG. 7 is a partly sectional side view showing the full repair sleeve assembly comprising the welded repair sleeve and a reinforcing oversleeve assembly;

DESCRIPTION OF THE PREFERRED EMBODIMENT

Figure 8:
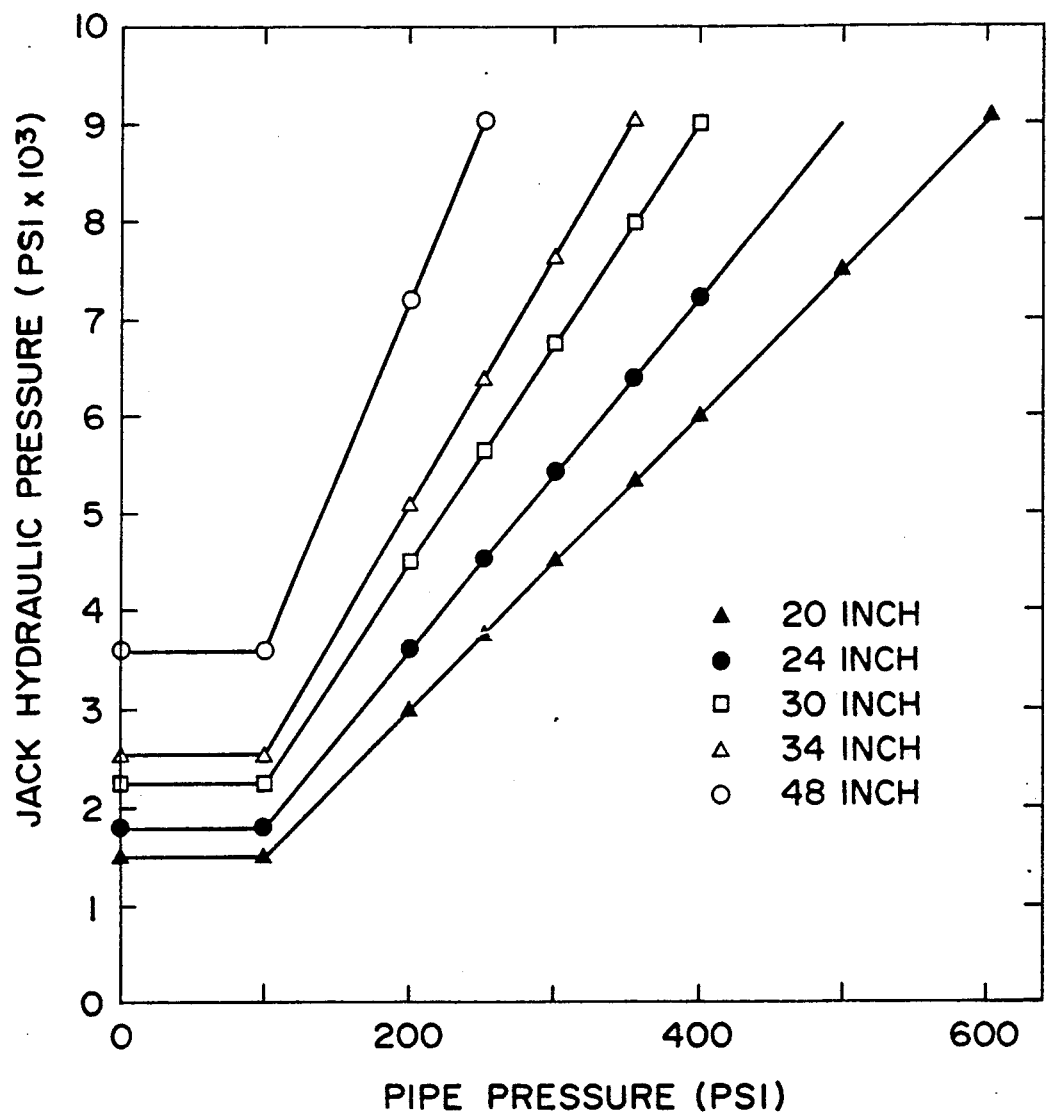
FIG. 8 is a plot showing recommended hydraulic cylinder pressures for an Enerpac* RCH-603 hydraulic cylinder, which is being used to actuate the scissor clamp of FIG. 6, for various pipeline diameters and internal pressures.
Figure 9:
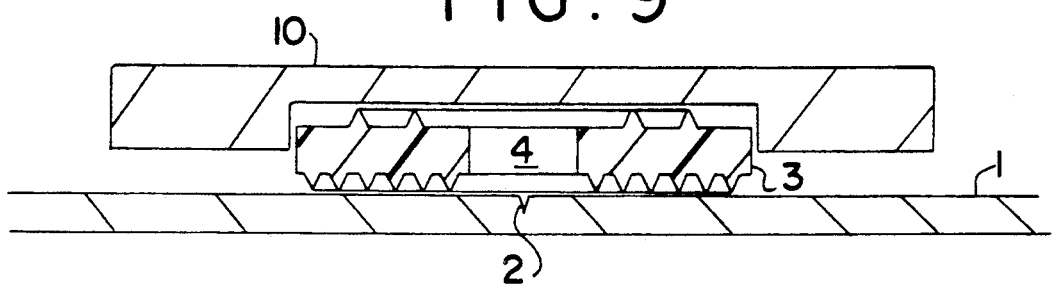
FIG. 9 is a side sectional view showing the seal element in the shell and positioned against a pipeline wall having a defect, said element surrounding the defect, said element being in the uncompressed state.
Figure 10:
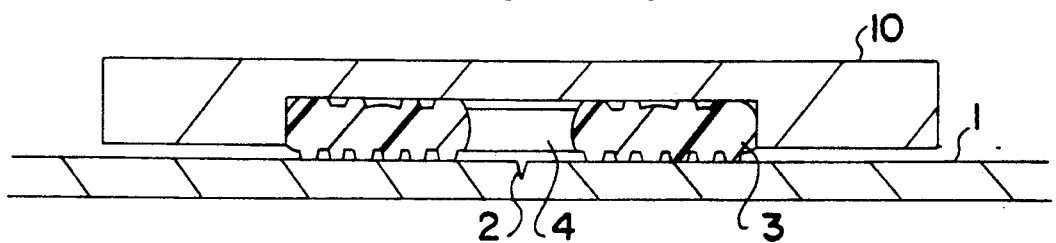
FIG. 10 is the same as FIG. 9 except that the seal element has now been partly compressed against the wall.

The invention is exemplified by the following example.

A 20 inch outside diameter by 19.25 inch inside diameter steel pipeline 1 had a hairline crack 2, about 0.5 inches in length, in its wall. The pressure within the pipeline during use was about 500 psig.

A seal element 3, formed of flexible, deformable, resilient material, was provided. More particularly, the seal member 3 was formed of an 83 A Durometer urethane.

The seal element 3 was flat, cylindrical and annular in configuration. It formed a central aperture 4 and had inner and outer diameters of 2⅛" and 4⅞". The main body of the seal element 3 had a vertical extent of 5/16" and on its inner, first pipeline-engaging surface 5 it had six inwardly projecting, spaced apart, concentric, continuous, annular ribs 6, each having a height of ⅛". The ribs 6 tapered from a base 7, ⅛" thick, to a pointed rim 8. On its seconds or shell-engaging surface 9, the seal element 3 had two ribs 6 of the nature just described.

Two semi-circular steel shells 10, 11 were provided. Each shell had an interior diameter of 20 inches, a thickness of 0.5 inches, and a total length of 15 inches. Each shell was formed with lapped ends 12.

The inner surface 13 of the first shell 10 was formed to provide a circular recess 14, 0.2 inches in depth and 5 inches in diameter, said recess being adapted to snugly receive the seal element 3. In the unclamped condition, the seal element 3 protruded inwardly about 0.25 inches beyond the inner surface 13 of the shell. The lateral and upright surfaces 15, 16 of the recess 14 functioned to support closely and continuously the top and outer side surfaces 17, 18 of the seal element 3, to thereby prevent substantial upward or 4 sideways extrusion of the seal element 3.

The pipeline surface 19 about the crack 2 was cleaned. The shells 10, 11 were placed about the line with the seal element 3 surrounding the crack 2.

Sheets 20 of high density polyethylene were placed on the outside surfaces of the shells 10, 11. A chain 21 was secured at its ends to the pins 22, 24 of a scissor clamp 25. A hydraulic cylinder 23 was pivotally attached to one arm 25a of the clamp 25 and abutted a rounded shoulder 30 formed by the other clamp arm 25b. The chain 21 extended circumferentially around the shells 10, 11 and sheets 20, as illustrated. A hydraulic pump (not shown) was hand operated to contract the cylinder 23 until the hydraulic pressure exerted was 5500 psi. This pressure was determined from the curves shown on FIG. 8. The inside surfaces 13 of the shells were in steel-on-steel pressing engagement with the pipeline 1.

The shell ends 12 were then spot welded with the shells in the stressed condition. The chain, cylinder and sheets were removed and the longitudinal and circumferential welds were completed.

The seal element 3 effectively isolated and sealed the crack 2 during welding.

The split collars 33 were then emplaced about the pipeline 1 and the steel outer shells 34 were welded longitudinally along their ends and circumferentially to the collars 33. The chamber 35 was then filled with liquid epoxy through the port 36 to complete the repair assembly.

The shell halves 10 and 11 have non-apertured walls defined by semi-cylindrical inner surfaces 13, pairs of end edges and pairs of side edges 12. The recess 15 has a floor 14 which is a closed surface and a side surface which is a continuous wall 16.

The foregoing describes one specific embodiment of the invention. The claims now following set forth the scope of protection pertaining to the invention.

The embodiments of the invention in which an exclusive property or privilege is claimed are defined as follows:

1. A steel pipeline containing pressurized fluid and having a leaking aperture in its wall and a repair sleeve assembly sealing the aperture, said repair sleeve assembly comprising a pair of substantially semi-circular non-flanged first and second steel shells with end edges and side edges, having non-apertured walls defined by semi-cylindrical surfaces inside, and a flat annular seal element retained by the first of the shells, and seal element having first and second surfaces and inner and outer side surfaces, said first shell having a semi-cylindrical inner surface which includes an inwardly opening recess defined by continuous walls shaped to closely fit and receive the seal element, the recess having a closed floor and defining an area substantially less than that of the semi-cylindrical inner surface, the seal element being seated in the recess in abutment with the floor and substantially filling the recess, so that the seal member is rigidly confined along the full extent of its second and outer side surfaces by the continuous walls forming the recess with the seal element surrounding the aperture and its first surface sealing against the pipeline surface, the seal element having a central opening that is in communication with the leak aperture, whereby the pressurized fluid acts against the seal element's inside side surface, said seal element being formed of flexible deformable resilient material, said shells extending around substantially the entire periphery of the pipeline, said shells having been circumferentially clamped to the pipeline so that the non-recessed portions of their semi-cylindrical inside surfaces are in tight steel-on-steel contact with the pipeline and the shells are in a stressed state, with the side edges of the shells being spaced from one another in opposed relation, and said shells being welded to one another longitudinally at the side edges and circumferentially to the pipe at the end edges while in the stressed state to effectively form a pressure vessel with the pipeline.

2. The combination as set forth in claim 1 wherein:

the seal element has a plurality of concentric continuous annular ribs protruding from its top and bottom surfaces.

3. The combination as set forth in claim 1 comprising:

a pair of split collars being mounted around the pipeline upstream and downstream of the repair sleeve assembly; and an oversleeve assembly comprising two semi-circular shells bridging between the collars and being welded longitudinally and circumferentially to the collars, said shells forming an outer sleeve which is radially spaced from the repair sleeve assembly.

* * * * *